Jan. 30, 1934.　　A. E. GUSKEA ET AL　　1,945,399
APPARATUS FOR PRESSING CLAY PRODUCTS
Filed Aug. 15, 1932　　5 Sheets-Sheet 1

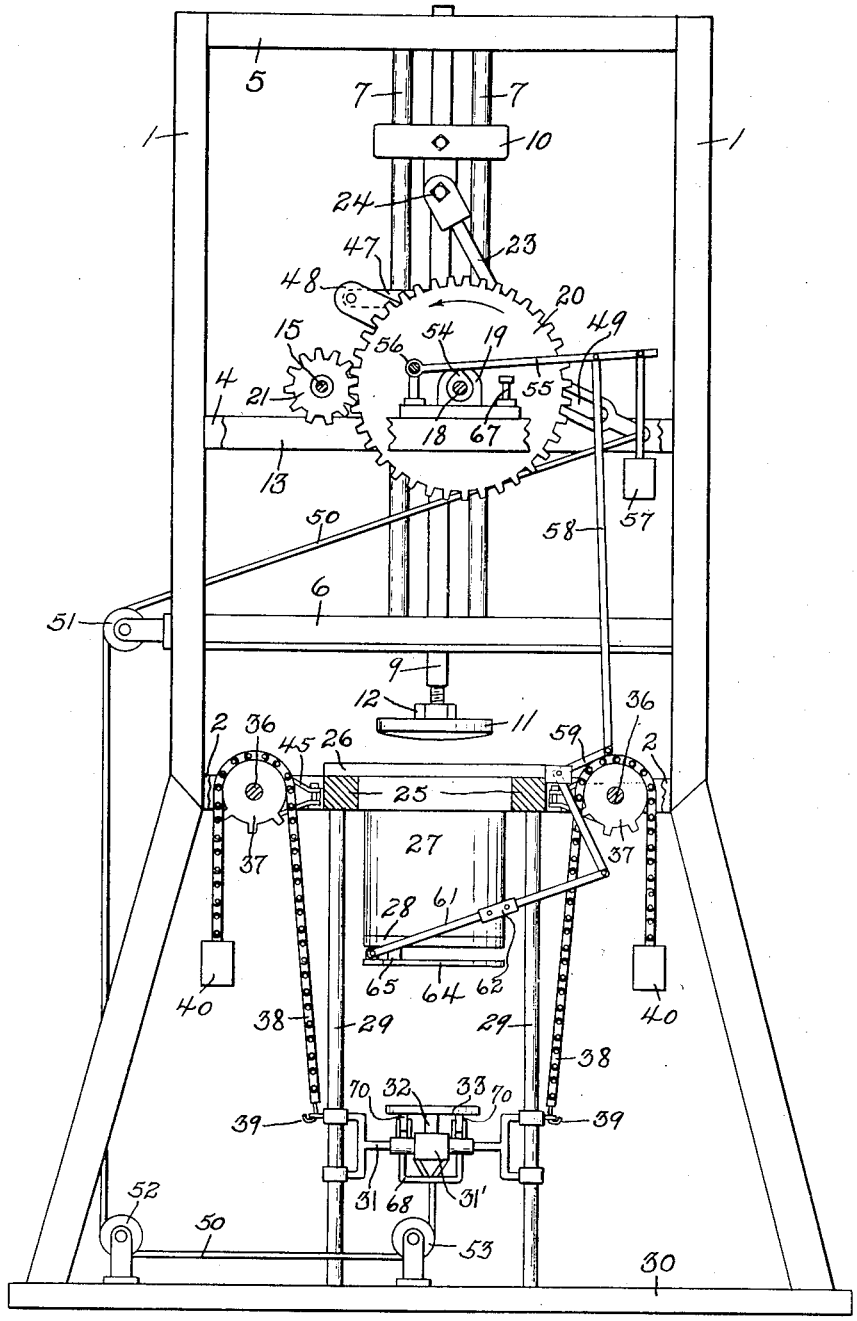

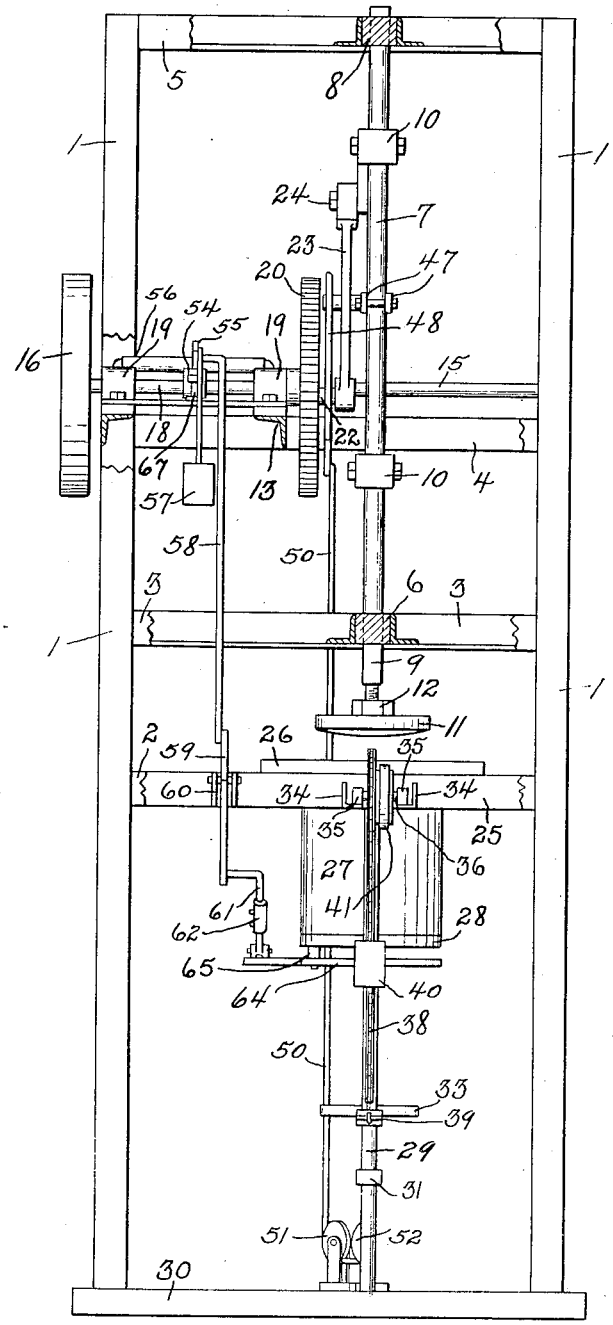

Jan. 30, 1934.   A. E. GUSKEA ET AL   1,945,399
APPARATUS FOR PRESSING CLAY PRODUCTS
Filed Aug. 15, 1932   5 Sheets-Sheet 4
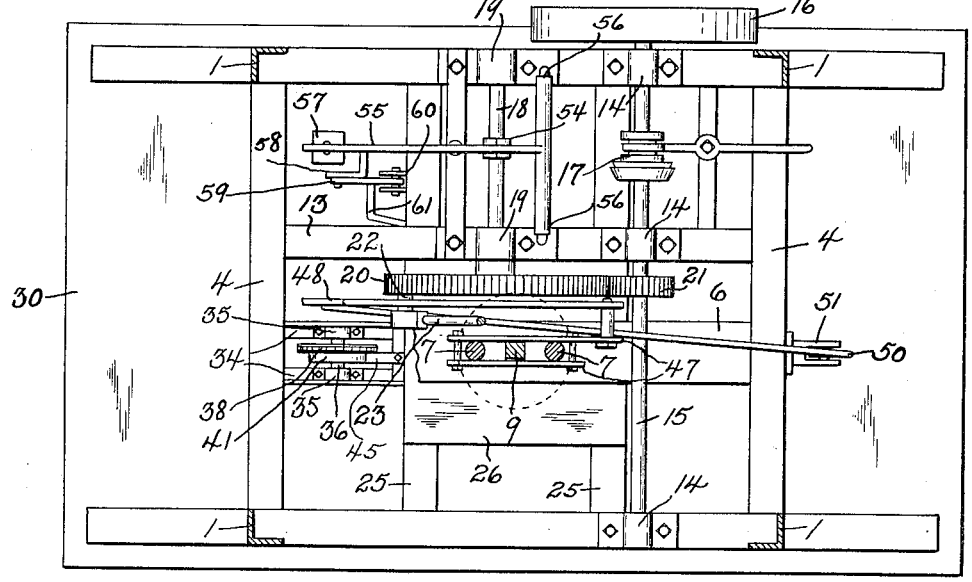
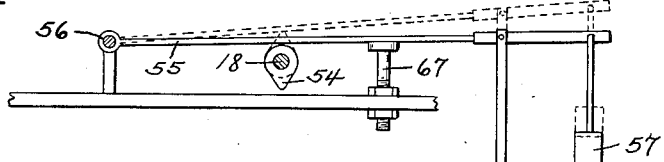
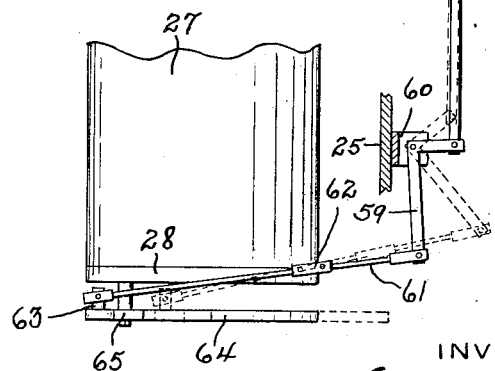
INVENTORS
Andrew E. Guskea
Steve Homa
Joseph Schultz
BY M. J. Maurion
ATTORNEY

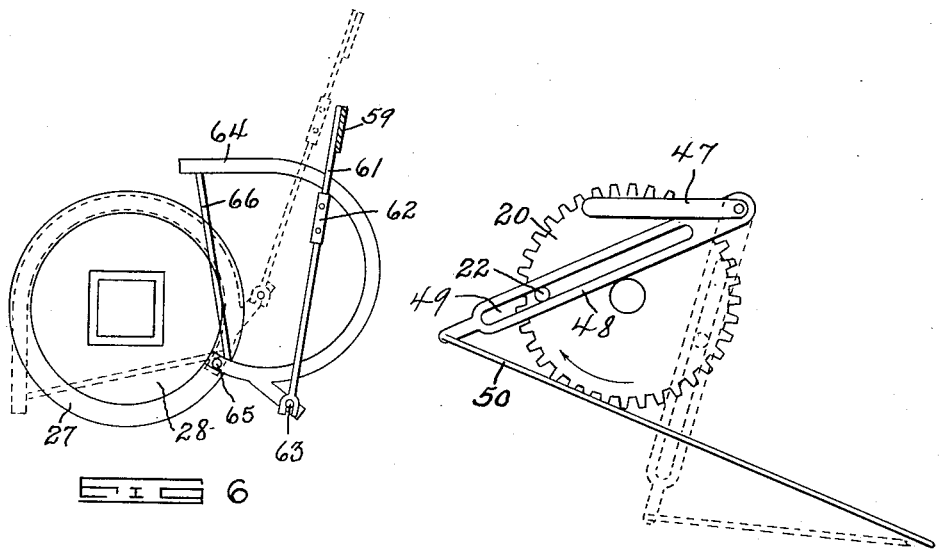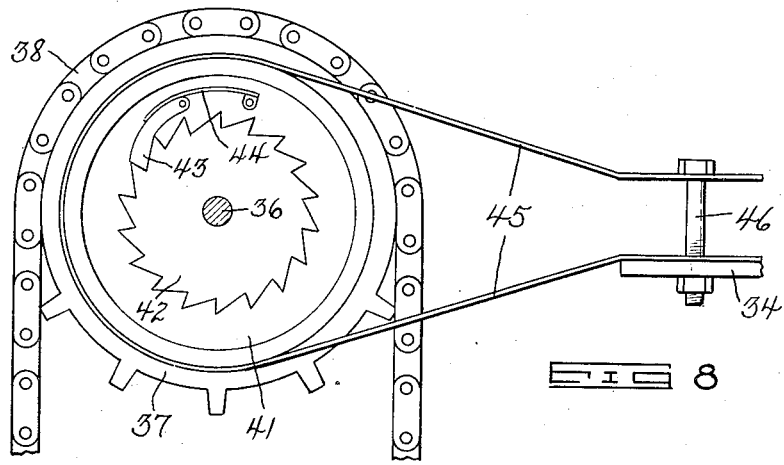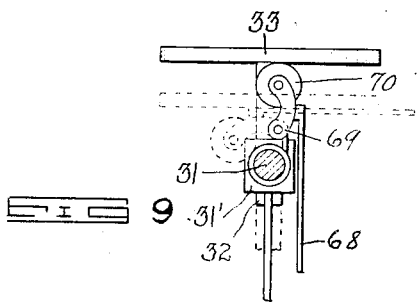

Patented Jan. 30, 1934

1,945,399

UNITED STATES PATENT OFFICE 1,945,399

APPARATUS FOR PRESSING CLAY PRODUCTS

Andrew E. Guskea, Steve Homa, and Joseph Schultz, Toronto, Ohio

Application August 15, 1932. Serial No. 628,784

9 Claims. (Cl. 25—30)

This invention relates broadly to apparatus for manufacturing clay products, and it has for its object to provide a press for simplifying the manufacture of such clay products as sewer pipe, flue liners, conduit for electric cables, and the like.

A further object of the invention is to provide a press of the character mentioned which is substantially automatic in its operation and which, therefore, is responsible for great economy in the production of clay products.

A further object of the invention is to provide a press for extruding therefrom such products as those above mentioned, the mechanism having associated therewith cutting means whereby such products are automatically cut into predetermined desired lengths.

A still further object of the invention is to provide a table for supporting the formed product as it is being extruded downward from the die of the press, such table being automatically supported by mechanical tension against the lower end of the formed product and receding downwardly away from the die with the thereby carried formed product in a manner and at a speed that the product (still in its plastic state) will not collapse, buckle or bend.

With these and other important objects in view, the invention resides in the features of construction, arrangement of parts, and combination of elements which will hereinafter be described, reference being had to the accompanying drawings, in which—

Figure 2 is a rear elevation of the invention similar to Fig. 1;

Figure 3 is an end elevation of the same, portions of the frame being shown in broken section;

Figure 4 is a top sectional view, the section being taken on line 4—4, Fig. 1, a portion of the structure being shown in fragmentary section;

Figure 5 is a detail view of the cutter and its associated actuating mechanism;

Figure 6 is a bottom view of the cylinder and associated forming die illustrating the operation of the cutter;

Figure 7 is a detail view of the slotted lever and cable for actuating downward travel of the supporting table and cross-bar;

Figure 8 is a detail view of the brake and ratchet mechanism controlling the downward speed and operation of the supporting table; and—

Figure 9 is a sectional view, the section being taken on line 9—9, Fig. 1.

Figure 1:
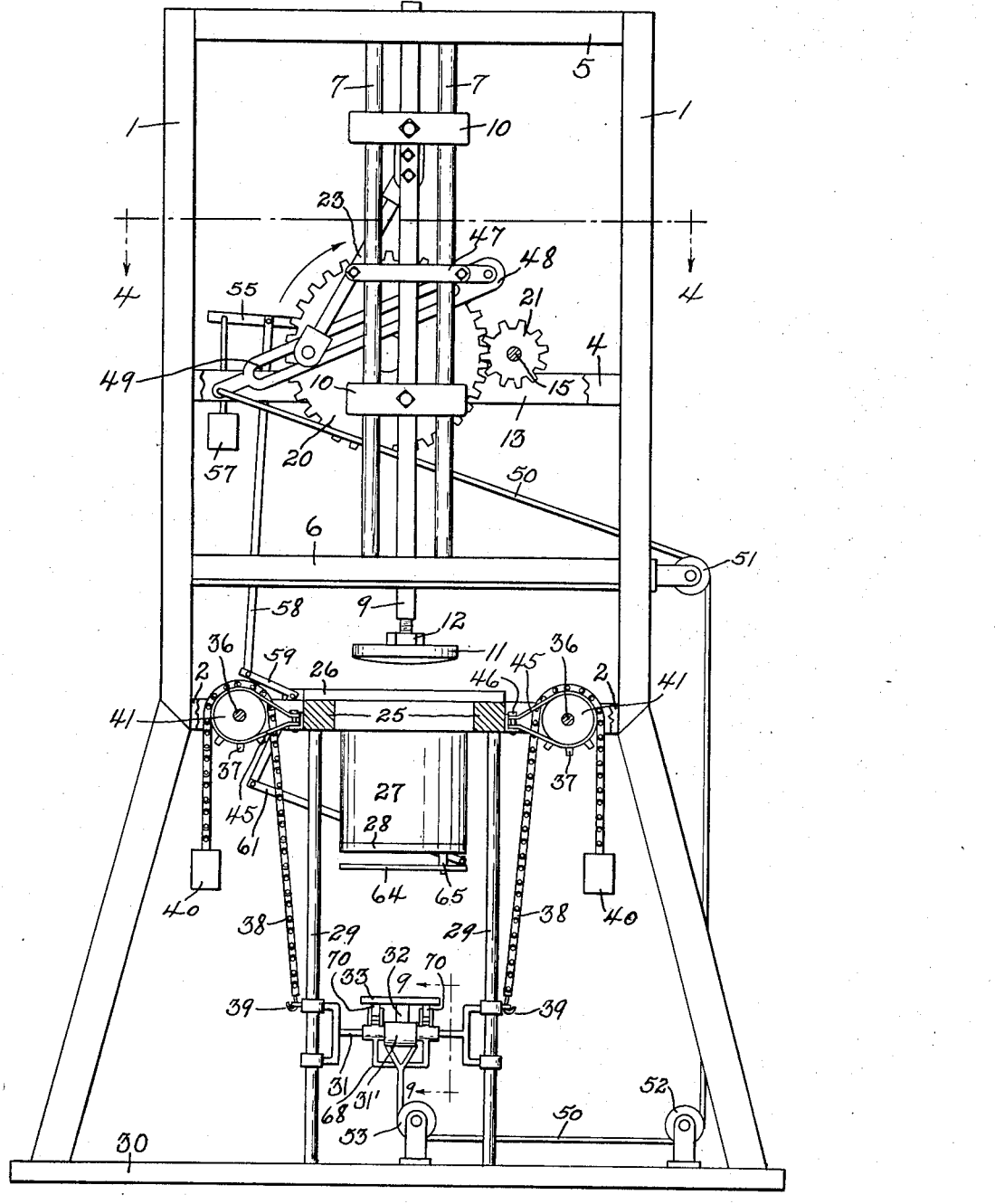
Figure 1 is a front elevation of the invention with a portion of the frame thereof shown in broken section.

Referring to said drawings, the reference numeral 1 designates generally the upright corner members of a frame of a press, said corner members being positioned relative to a rectangular arrangement, said vertical corner members being supported in rigid position by means of horizontally disposed bracing members 2, 3, 4 and 5, respectively, the bracing members 3 being located only at the opposite ends of the frame.

A supporting bar 6 has each of its ends supported by the end bracing members 3, and, in turn, said bar 6 supports intermediate its ends a pair of spaced parallel vertically extending standards or guides 7, the upper ends of said guides being rigidly held in position by a bar 8 extending longitudinally of the frame adjacent the upper end thereof.

A vertically reciprocable plunger rod 9 is provided intermediate the parallel guides 7, the same being vertically slidable through bearing apertures (not shown) located in the bars 6 and 8. The plunger rod 9 has permanently attached thereto guide plates 10 whose opposite ends embrace the vertical guides 7 and are slidable thereon for affording true vertical reciprocal movements to the rod 9.

The lower end of the plunger rod 9 is provided with screw threads and is designed to have threaded thereon a die head 11, said head 11 being held in fixed position by means of a lock nut 12. Obviously, this arrangement permits limited vertical adjustment to be made of the die head 11 with respect to the die, which will hereinafter be fully explained.

A bearing supporting member 13, preferably made of angle iron, extends longitudinally of the frame of the press and has its opposite ends permanently attached to the two end bracing members 4, as clearly shown in Fig. 4.

Journaled in bearings 14 is a shaft 15 which carries on one of its ends a pulley wheel 16 and which is separated intermediate its ends, preferably between the bracing member 4 and the supporting member 13, for the introduction of appropriate clutch mechanism 17.

A short shaft 18 is journaled in bearings 19 and carries on its inner end a gear 20 which meshes with a pinion 21 carried by the shaft 15. Said gear 20 carries on its face a wrist pin 22 which has connected thereto the lower end of a connecting rod 23, the opposite, or upper, end of said connecting rod being connected to a trunnion 24 which is permanently attached to the plunger rod 9.

Spaced parallel bars 25 span the distance between the front and rear bracing members 2 and support intermediate their ends an apertured plate 26 from which depends a cylinder 27, in the lower end of which is located the usual bell or forming die 28.

As is manifest, rotation of the shaft 15 by means of appropriate power applied to the pulley wheel 16 imparts rotation to the gear 20 through the pinion 21. Rotation of the gear 20 imparts alternate vertical reciprocal movements to the plunger rod 9 and the thereby carried head 11 through the intermediacy of the connecting rod 23, as is well understood. Thus, clay in its plastic state introduced in a mass into the interior of the cylinder 27 will be extruded or expelled downward and outward from said cylinder and past the forming die 28 on the downward stroke of the head 11 to form the clay product.

As is well known in the art, considerable upward pressure must be applied to the lower end of the formed product as it is being expelled downwardly from the die in order to prevent collapse of the formed product and to keep the product from becoming bent or out of alinement. This is ordinarily accomplished by means of a vertically slidable table which is located directly underneath the cylinder 27 and which is designed to support the pressed product and to recede downwardly away from the cylinder at substantially the same speed at which the formed product is being expelled from said cylinder during the pressing operation, said table at all times being under sufficient upwardly applied pressure against the lower end of the product as it is being expelled to prevent collapse or bending of the formed clay product. To so operate the table and to apply the necessary pressure, we have designed a mechanical arrangement which is purely automatic and requires no manual attention, and which will now be described.

A pair of spaced parallel guide posts 29 have their upper ends permanently attached to the bars 25 and have their lower ends resting on the base 30 of the press. So disposed, as shown in Figs. 1 and 2, the cylinder 27 occupies a position between the two parallel guide posts 29. A cross bar 31 is disposed between the guide posts 29 and has each of its ends bifurcated and embracing the guide posts, thereby permitting the bar 31 to be vertically movable thereon. As shown in the drawings, particularly Fig. 9, the cross bar is made round in cross section, but the same has a portion 31' midway of its length of rectangular form in cross section. This rectangular portion is vertically apertured to removably receive therein a stem 32 upon the upper end of which is permanently attached the under side of the supporting table 33, the latter being of flat disk form.

As shown in Figs. 3 and 4, spaced bearing supports 34 are located between the end bracing members 2 and the plate 26, each pair of said supports carrying bearings 35 in which are journaled a shaft 36 carrying a sprocket wheel 37, the peripheral teeth of which engage or mesh with a length of sprocket chain 38. One end of each chain 38 is provided with a hook 39 which engages a loop or eye provided on the bifurcated end of the cross bar 31. The opposite end of each chain carries a counterweight 40 for a purpose to be hereinafter made clear.

A brake drum 41 is also carried by each of the shafts 36 adjacent the sprocket wheel 37, said drum 41 normally being freely rotatable on said shaft. Located internally of the peripheral flange of the brake drum and carried by the shaft 36 in fixed relation thereto is a ratchet 42 adapted for engagement with a pawl 43 pivotally connected to the internal side wall of the drum 41 and maintained in contact with the ratchet by means of the spring 44. A suitable brake band 45 embraces the brake drum 41 and the braking power or tension of said band is rendered adjustable by means of the bolt 46.

A lever support 47 composed of two plates which complementally embrace the guides 7 approximately midway of their heighth has pivotally connected thereto the upper end of a slotted lever 48. This lever, as is shown in detail in Fig. 7, is constructed so as to provide a longitudinally extending slot or guideway 49 intermediate its sides, and which slot or guideway has slidably received therein the wrist pin 22 of the gear 20, said slotted lever preferably occupying a position intermediate the face of the gear 20 and the connecting rod 23.

One end of a length of wire cable 50 is permanently fastened to the lower end of the slotted lever and said cable extends therefrom outwardly and downwardly of the press frame, being passed over a pulley 51 located at one end of the frame and then being passed inwardly about pulleys 52 and 53 which are located on the base of the press. From said pulley 53, which is located directly beneath the supporting table 33, the cable is extended upwardly and the end fastened to the cross bar 31. As will be noted, the cable 50 positively connects the cross bar 31 and the slotted lever 48.

With the plunger rod 9 and the thereby carried die head 11 in its fully raised position for the commencement of the downstroke of the latter elements, the slotted lever 48 occupies a position depending substantially vertical from its pivot. At this point, the table 33 occupies an elevated position abutting the die 28. Rotation of the gear 20 in the direction indicated by the arrows in Figs. 1 and 7 causes the wrist pin 22 to travel in the guideway toward the lower end of the lever thereby swinging the lower end of the lever upwardly in the arc of a circle during its travel, as is shown in Fig. 7. Such swinging movement imparted to the lever causes the cable 50 to be carried thereby, resulting in pulling the cross bar 31 and table 33 downwardly and away from the die. This action is synchronized with the downstroke of the die head through the cylinder so that the supporting table 33 is receding downwardly supporting the lower end of the product being formed.

The downward travel of the cross bar 31 carries with it the sprocket chains 38, rotating the sprocket wheels 37 and their shafts 36 in their travel. Rotation of the shafts 36 results in the thereby carried ratchets being rotated in like direction and thus engaging the pawls 43. Such engagement of the pawls directly connect the brake drums 41 with the rotation of the shafts and the drums are caused to likewise rotate. Such rotation, however, is resisted somewhat due to the pressure exerted by the brake bands 45 on the drums resulting in the cross bar being lowered against a certain amount of resistance.

Said brake mechanism is rendered particularly desirable in the event that the downward pressure exerted by the formed product should exceed the pulling pressure exerted by the cable, as when the cable is stretched somewhat to allow slack in its length. Additionally, the counterweights 40 carried by the chains add further resistance to the downward travel of the cross bar, all of which tend to afford sufficient upward pressure by the table 33 against the lower end of the product being formed to prevent collapse or sagging of the product.

At the limit of the downstroke of the die head 11, the formed product is automatically cut into a predetermined length by a cutting mechanism to be described later. However, on the upstroke of the plunger 9 and die head 11, the end of the slotted lever 48 to which is attached the end of the cable 50 is still being elevated due to the path of travel taken by the wrist pin 22 with respect to the guideway 49, as will be understood after a study of Fig. 7 of the drawings. Thus, it will be seen that the supporting table 33 and crossbar 31 continue their downward travel away from the die during both the downstroke and upstroke of the plunger. This permits the formed and severed product to be lowered sufficiently to permit its removal from the table 33.

At the approximate instant the upstroke of the plunger is completed and the gear 20 has rotated to a point where the downstroke of the plunger is about to commence, the wrist pin 22 has exerted its lifting force with respect to the lever 48 and has traveled in the guideway 49 to a point adjacent the upper, or pivoted, end of the slotted lever 48. At this point, the wrist pin 22 commences to travel downwardly in the arc of a circle and exerts a depressing force returning the slotted lever downwardly to the initial vertical depending position.

The return stroke of the slotted lever 48 to its depending position is accelerated inasmuch as the fulcrum of the leverage force exerted by the wrist pin on the slotted lever is considerably lessened due to the travel of the wrist pin in the guideway. It will be seen from an examination of Fig. 7 of the drawings that an elevating force is applied to the lever throughout approximately 270° of the rotation of the gear 20 and that the slotted lever is returned to its depending position during the remaining 90° of rotation. Thus, tension is instantaneously released on the cable and the same becomes slack, at which time the counterweights 40 are taken downward by gravity at considerable speed, lifting the table 33 and cross bar 31 upwardly by means of the chains 38 to a position underlying and abutting the forming die prior to the time the die head on its downstroke enters the cylinder for forming another product. The brake drums 41 are rendered inoperative, or stationary, during the upward travel of the table 33 and the simultaneous downward travel of the counterweights 40 due to the fact that the teeth of the ratchet 42 are not engaged by the pawl 33, but ride freely thereunder.

The construction and operation of the automatic cutting mechanism hereinbefore referred to is substantially as follows:

Keyed or fastened to the shaft 18, intermediate its ends, preferably between the bearings 19, is a cam 54 designed to act upon the under side of a lever 55, which has one end pivotally connected, as shown at 56, and the opposite end having suspended therefrom a counterweight 57. Adjacent the free end of said lever 55 is suspended in a ball and socket joint a connecting link or rod 58 which, in turn, acts upon a bell-crank 59. Said bell-crank is pivoted to a clevis-bearing 60. The end of the bell-crank opposite that attached to the connecting link 58 is connected to one end of a horizontal connecting rod 61 (shown adjustable as to length by means of a slip-coupling 62). The end of the horizontal connecting rod opposite the end attached to the bell-crank is bifurcated forming a clevis or yoke which pivotally engages a pin 63 formed integral with the bow-cutter 64, which latter is in turn pivotally connected to the underside of the cylinder 27, as shown at 65. Across the chord of the arc formed by this bow-cutter is fastened a cutting element 66, preferably of taut wire. A vertically adjustable set screw 67 is provided to limit the throw of the cutter.

Rotation of the shaft 18 causes similar rotation of the cam 54. The form or throw of said cam raises and depresses the lever 55 about its pivotal point, carrying vertically therewith the connecting rod 58 and bell-crank 59, in turn imparting a reciprocating horizontal motion to the rod 61. As is obvious, such movement imparts to the bow-cutter oscillatory motion about its pivotal point in such manner and to such an extent that the cutting element 66 is driven through the formed product, completely severing the latter. The above described cutting action is so timed or synchronized by proper location of the throw of said cam so as to cause the formed product to be severed at the instant of commencement of the upward stroke of the die head 11 and during downward movement of the supporting table 33. The counterweight 57 is provided solely for the purpose of assuring positive downward movement of said lever 55.

Mounted on the rectangular portion 31' of the cross bar 31 is a U-shaped table elevating lever 68, the vertical extending portions thereof being pivoted intermediate their ends to the rectangular portion 31' of the cross bar, as shown at 69, and each of said vertical members carries rollers 70 at their upper extremity. Said rollers, when the lever occupies a vertical position, are designed to support the table 33 elevated above the cross bar, and said table occupies such elevated position during normal operation of the press. However, in the event that some hard foreign substance should become mixed with the plastic clay and should inadvertently be introduced into the cylinder and which could not be expelled past the die, thereby clogging the latter, downward reciprocation of the die head 11 may be stopped, as by means of the clutch mechanism 17. The portion of the formed product already expelled downwardly from the die may be manually severed adjacent the die, following which the lower portion of said lever 68 is raised upwardly 90° in the arc of a circle, thereby moving said lever from a vertical position to a horizontal position, resulting in the table 33 being lowered by gravity sufficiently to permit removal of the severed portion of the product and providing ready access to the forming die for removal from the cylinder, after which the foreign substance may be readily removed. The operation herein described is illustrated in detail in Fig. 9 of the drawings.

It is thought that the operation of the press and the function of its various parts will readily be understood from the foregoing description and that, therefore, a further detailed description of the operation would add nothing of importance to a clear understanding of this invention. Further, while we have described the invention more or less in detail, it will be understood that we do not limit ourselves to details of construction and arrangement of parts except as may be required by a fair interpretation of the terms of the appended claims.

What is claimed is—

1. In a press of the character described, a cylinder having a forming die associated therewith, a crank rotatably mounted on said press, a die head carried by a plunger rod reciprocable in said cylinder and adapted to have reciprocable movements imparted thereto by means of said crank, a slotted lever having one end thereof pivoted to a stationary portion of the press, said crank being adapted to travel longitudinally in said slotted lever for raising and lowering the free end of said lever, a vertically movable supporting table located beneath said cylinder, and means connecting the free end of said slotted lever and said supporting table whereby upward movement of the free end of said slotted lever imparts a lowering movement to said table.

2. In a press of the character described, a cylinder having a forming die associated therewith, a crank rotatably mounted on said press, a die head carried by a plunger rod reciprocable in said cylinder and adapted to have reciprocal movements imparted thereto by means of said crank, a slotted lever having one end thereof pivoted to a stationary portion of the press, said crank being adapted to travel longitudinally in said slotted lever for raising and lowering the free end of said lever, a vertically movable supporting table located beneath said cylinder, means connecting the free end of said slotted lever and said supporting table whereby upward movement of the free end of said slotted lever imparts a lowering movement to said table, and means independent of said last mentioned means for imparting elevating movement to said table.

3. In a press of the character described, a cylinder having a forming die associated therewith, a crank rotatably mounted on said press, a die head carried by a plunger rod reciprocable in said cylinder and adapted to have reciprocal movements imparted thereto by means of said crank, a slotted lever having one end thereof pivoted to a stationary portion of the press, said crank being adapted to travel longitudinally in said slotted lever for raising and lowering the free end of said lever, a vertically movable supporting table located beneath said cylinder, means connecting the free end of said slotted lever and said supporting table whereby upward movement of the free end of said slotted lever imparts a lowering movement to said table, means independent of said last mentioned means for imparting elevating movement to said table, and cutting means synchronized with the rotation of said crank and adapted to function during a portion of the rotation of said crank.

4. In a press of the character described, a cylinder having a forming die associated therewith, a crank rotatably mounted on said press, a die head carried by a plunger rod reciprocable in said cylinder and adapted to have reciprocal movements imparted thereto by means of said crank, a slotted lever having one end thereof pivoted to a stationary portion of the press, said crank being adapted to travel longitudinally in said slotted lever for raising and lowering the free end of said lever, a vertically movable supporting table located beneath said cylinder, and means connecting the free end of said slotted lever and said supporting table whereby upward movement of the free end of said slotted lever imparts a lowering movement to said table, said lowering movement being accomplished against the retarding force exerted by applied braking energy.

5. In a press of the character described, the combination of a forming die and a reciprocable die head, a rotatable crank mounted on said press by means of which reciprocatory movements are imparted to said die head, slidable means located in line with said forming die for supporting the formed product as it is expelled from said die and adapted to recede away from said die, and means synchronized with the rotation of said crank for severing the formed product into a predetermined length during the travel from said die.

6. In a press for forming clay products, the combination of a forming die and a reciprocable die head, a rotatable crank carried by said press by means of which reciprocatory movements are imparted to said die head, vertically slidable means underlying said forming die for supporting the formed product following expulsion thereof from said die, means connecting said crank and said slidable means and synchronized with the stroke of the die head for effecting downward travel of said supporting means, and independent means for effecting upward return travel of said supporting means following removal of said product.

7. In a press for forming clay products, the combination of a forming die and a reciprocable die head, a rotatable crank carried by said press by means of which reciprocatory movements are imparted to said die head, vertically slidable means underlying said forming die and normally held in underlying abutting relation to said forming die by means of suspended counterweights attached thereto, and means connecting said crank and said slidable means and synchronized with the stroke of the die head for effecting downward travel of said supporting means at a predetermined speed against the resistance of said counterweights.

8. In apparatus for forming clay products, a frame, a reciprocable die head operable in a forming die, a rotatable shaft journaled in bearings on said frame and carrying a crank by means of which reciprocatory movements are imparted to said die head, vertically movable means underlying said forming die for supporting the formed product as it is expelled from the forming die, cutting means pivotally connected beneath said die adapted upon actuation to sever said product into a predetermined length, and means for actuating said cutting means consisting of a cam carried by said crank-carrying shaft and link and lever mechanism attached to said cutting means and said frame.

9. In a press for forming clay products, a forming die, a reciprocable die head, a rotatable crank mounted on said press by means of which reciprocatory movements are imparted to said die head, vertically movable means underlying said die for supporting the formed product as it is expelled from said die, means connected to said crank and said supporting means for effecting downward travel of said supporting means, and ratchet controlled braking means whereby downward travel of said supporting means is effected automatically against applied braking force and upward return movement is effected without such braking force.

ANDREW E. GUSKEA.
STEVE HOMA.
JOSEPH SCHULTZ.